(12) United States Patent
Kikuta et al.

(10) Patent No.: US 8,888,892 B2
(45) Date of Patent: Nov. 18, 2014

(54) METHOD FOR SEPARATING NICKEL AND COBALT FROM ACTIVE MATERIAL CONTAINED IN SPENT NICKEL-METAL HYDRIDE BATTERY

(75) Inventors: Naoko Kikuta, Nihama (JP); Satoshi Asano, Nihama (JP); Masatoshi Takano, Nihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 127 days.

(21) Appl. No.: 13/809,302

(22) PCT Filed: Nov. 16, 2010

(86) PCT No.: PCT/JP2010/070370
§ 371 (c)(1),
(2), (4) Date: Jan. 9, 2013

(87) PCT Pub. No.: WO2012/011205
PCT Pub. Date: Jan. 26, 2012

(65) Prior Publication Data
US 2013/0112043 A1 May 9, 2013

(30) Foreign Application Priority Data

Jul. 21, 2010 (JP) .................... 2010-164306

(51) Int. Cl.
| | | |
|---|---|---|
| C22B 7/00 | (2006.01) | |
| C22B 23/00 | (2006.01) | |
| C22B 59/00 | (2006.01) | |
| C22B 3/44 | (2006.01) | |
| C22B 3/00 | (2006.01) | |
| H01M 10/54 | (2006.01) | |

(52) U.S. Cl.
CPC ............. C22B 23/043 (2013.01); H01M 10/54 (2013.01); C22B 23/0461 (2013.01); Y02E 60/12 (2013.01); C22B 7/007 (2013.01); C22C 59/00 (2013.01)
USPC ............ 75/739; 75/743; 423/150.1; 423/140; 423/101; 423/109; 423/21.1

(58) Field of Classification Search
CPC ...... C22B 7/007; C22B 23/043; C22B 59/00; C22B 23/0461; C22B 3/44
USPC ......... 75/743, 739; 423/150.1, 140, 101, 109, 423/21.1
See application file for complete search history.

(56) References Cited

U.S. PATENT DOCUMENTS 5,858,061 A * 1/1999 Kleinsorgen et al. ........... 75/711
7,964,165 B2 6/2011 Nakai et al.

FOREIGN PATENT DOCUMENTS

| JP | 54-89904 | 7/1979 |
|---|---|---|
| JP | 6-81050 | 3/1994 |

(Continued)

OTHER PUBLICATIONS

Derwent Acc No. 2010-K53503 for the patent family including JP 2010174366 A published Aug. 12, 2010 by Asano et al. Abstract.*

(Continued)

*Primary Examiner* — George Wyszomierski
*Assistant Examiner* — Tima M McGuthry Banks
(74) *Attorney, Agent, or Firm* — Gerald E. Hespos; Michael J. Porco; Matthew T. Hespos

(57) ABSTRACT

A method for separating nickel, cobalt and a rare earth element from a material containing positive and negative electrode active materials of a nickel-metal hydride battery includes mixing a material containing positive and negative electrode active materials with a sulfuric acid solution and dissolving therein, and then separating a leachate from a residue; adding an alkali metal sulfate to the leachate to obtain a mixed precipitate of double sulfate of rare earth elements, and a rare-earth-element-free solution; and adding a sulfurizing agent to the rare-earth-element-free solution to separate a nickel and cobalt sulfide raw material and a residual solution.

11 Claims, 1 Drawing Sheet

(56) References Cited

FOREIGN PATENT DOCUMENTS

| | | |
|---|---|---|
| JP | 9-82371 | 3/1997 |
| JP | 2002-241856 | 8/2002 |
| JP | 2003-41326 | 2/2003 |
| JP | 3918041 | 2/2007 |
| JP | 2006-144102 | 6/2008 |
| JP | 2010-37626 | 2/2010 |
| JP | 2010-126779 | 6/2010 |

OTHER PUBLICATIONS

Machine translation of 2010-174366 A published Aug. 12, 2010.*
Masayuki Yoshio et al.—Lithium Ion Niji Denchi—Zairyo to Oyo-, The Nikkan Kogyo Shinbun, Ltd., Mar. 29, 1996, pp. 164-165.
Notification of the first Office Action dated Feb. 4, 2011.
Notification of the second Office Action dated Dec. 28, 2011.

* cited by examiner

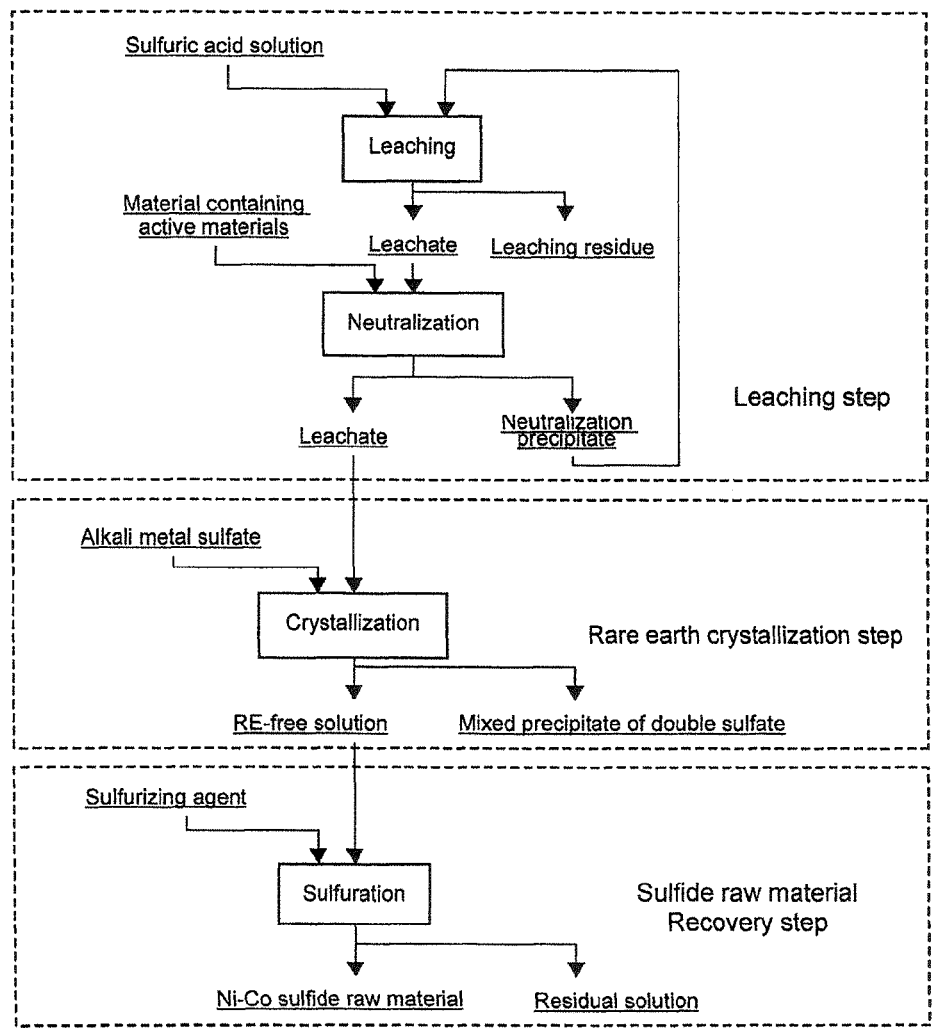

METHOD FOR SEPARATING NICKEL AND COBALT FROM ACTIVE MATERIAL CONTAINED IN SPENT NICKEL-METAL HYDRIDE BATTERY

BACKGROUND OF THE INVENTION

1. Field of the Invention

The present invention relates to a method for separating nickel, cobalt, and rare earths from positive and negative electrode active materials of nickel-metal hydride batteries which are spent ones or scraps generated during a manufacturing process.

2. Description of the Related Art

In recent years, environmental problems, such as acid rain attributable to acid gas of nitrogen oxide, sulfur oxide, etc. which is emitted into the air, and global warming due to carbon dioxide gas, have been highlighted as global problems. In order to reduce one of the causes, that is, contamination by exhaust gas of automobiles, hybrid vehicles equipped with a secondary battery such as a nickel-metal hydride battery have been attracting attention.

A nickel-metal hydride battery comprises a positive electrode, a negative electrode, an electrode terminal, and an electrolyte, as functional parts, and furthermore comprises such as an electrode substrate, a separator disposed between positive and negative electrodes, a case for housing these parts, as structural parts.

Various materials and components are comprised in such a manner that the positive electrode active material is composed of nickel hydroxide containing additional trace elements; the negative electrode active material is composed of a hydrogen storage alloy containing nickel, cobalt, rare earth elements (misch metal), etc.; the electrode substrate is composed of a nickel plate or a foam Ni plate, a nickel-plated iron plate, etc.; the separator is composed of synthetic resin; the electrolyte comprises a potassium hydroxide solution; the electrode terminal material is composed of metal of copper, iron, etc.; and the case is composed of synthetic resin, steel, etc.

As a structure of the nickel-metal hydride battery, first, there is an electrode body configured such that positive electrodes and negative electrodes are alternately layered, with disposing synthetic resin between each of the electrodes as a separator. The electrode body is placed into a case made of synthetic resin or steel, then the electrodes and the case are connected with electrode terminal materials made of steel or iron metal, and finally an electrolyte containing a potassium hydroxide solution as a main component is filled between the electrodes, and the case is sealed.

A large-capacity nickel-metal hydride battery installed in hybrid vehicles is replaced with a new one when deteriorating with use, or removed when a vehicle is scrapped, and then discarded as a spent nickel-metal hydride battery. In addition, there are generated defective products resulting during a manufacturing process of nickel-metal hydride batteries; parts, such as an active material and a negative or positive electrode material, which is not assembled into a battery and thus becomes unnecessary; and further trial products. As mentioned above, the spent nickel-metal hydride battery, defective products, parts, and trial products, etc. (hereinafter, these defective products, parts, trial products, etc. are also collectively referred to as a nickel-metal hydride battery) contain many kinds of rare and valuable metals, such as nickel, cobalt, and rare earth elements, and therefore recovering and reusing these valuable metals have been attempted.

However, nickel-metal hydride batteries have a complex and solid structure, and furthermore, are comprised of materials many of which are chemically stable. In addition, if a spent battery is disassembled without preparation, an abnormality, such as heat generation and ignition caused by partial short-circuiting inside the battery, could arise, and therefore, at the time of disassembling, a deactivation treatment, such as discharging and removing residual electric charge of the battery, is needed in advance. Accordingly, it was not easy that metals contained in a spent nickel-metal hydride battery, such as nickel, cobalt, and rare earth elements, were separated and recovered to be reused as materials for new batteries.

Therefore, as a method for recycling a metal from a spent nickel-metal hydride battery, there has been actually performed in recent years, for example, a method wherein a spent nickel-metal hydride battery is placed into a furnace to be melted, then synthetic resin, etc. constituting the battery are combusted to be removed, and further, most of iron is made into slag to be removed, then nickel is reduced to be made into an alloy with a part of iron and recovered as ferronickel. This method has advantages to use equipment of an existing smelter as it is and to save time and effort for the treatment, however, the recovered ferronickel is not suitable for any uses other than a stainless raw material, and in addition, most of cobalt and rare earth elements are distributed to slag and discarded, and also cobalt and rare earth elements which are distributed to ferronickel are treated as impurities. Because of this, from a viewpoint of effective utilization of rare cobalt and rare earth elements, this method is not desirable.

As another method, for example, as referred to in Japanese Unexamined Patent Publication No. 3918041, there has been proposed a method for recovering a metal from a spent nickel-metal hydride storage battery, the method comprising the steps of: forming an aqueous phase by dissolving a storage battery scrap with acid; separating rare earth metals from the aqueous phase as a double sulfate; then precipitating iron from the aqueous phase by raising pH; performing liquid-liquid extraction of a filtrate obtained after the iron precipitation by using an organic extractant to separate zinc, cadmium, manganese, aluminum, and residual iron and rare earth elements, wherein the extractant and the pH value is selected so that, after extraction, substantially only nickel and cobalt are dissolved into the aqueous phase to remain at the same atomic ratio as at the time of having existed inside the storage battery scrap; subsequently, precipitating a nickel/cobalt alloy from the aqueous phase; and finally using the nickel/cobalt alloy as a master alloy in order to manufacture a hydrogen storage alloy.

However, in this method, it is not easy that nickel and cobalt is electrodeposited as an alloy so as to have exactly the same ratio as in battery composition, and there is a possibility that, depending on a solution composition and an electrolytic condition, an composition of an electrodeposited alloy might change. Therefore, in order to accomplish an exact alloy composition, it takes extra time and effort to analyze an obtained alloy each time, and then to add a required amount of a component which is insufficient and to dissolve it again.

Furthermore, it is known that battery characteristics change depending on an alloy composition, and the alloy composition is changed by adding a new component in order to improve performance of a battery and kept improved, and therefore, a recovered nickel alloy and a recovered cobalt alloy are not necessarily suitable as a raw material of a battery material.

Thus, there was not found a process in which nickel and cobalt, and furthermore rare earths can be recovered from a spent nickel-metal hydride battery to be reused.

In view of such situation, the present invention aims to provide a method for reusably separating and recovering nickel, cobalt, and rare earth elements from positive and negative electrode active materials which constitute a nickel-metal hydride battery.

SUMMARY OF THE INVENTION

In order to solve the above-mentioned problem, the inventors found and accomplished that, for a material containing positive and negative electrode active materials which constitutes a nickel-metal hydride battery, a leaching step, a rare earth crystallization step, and a sulfurization step are sequentially performed, whereby nickel and cobalt, each contained in positive and negative electrode active materials, are made into a sulfide precipitate having a nickel-cobalt sulfide as a main component while rare earth elements contained in positive and negative electrode active materials are made into a sulfate, and thus each can be efficiently separated.

That is, a first aspect of the present invention is a method for separating nickel, cobalt, and rare earth elements from a material containing positive and negative electrode active materials of a nickel-metal hydride battery, wherein a production method having steps shown in (1) to (3) below is performed for the material containing positive and negative electrode active materials which constitutes a nickel-metal hydride battery to obtain a sulfide containing nickel and cobalt and a sulfate containing rare earth elements.

(1) A leaching step of mixing a material containing positive and negative electrode active materials with a sulfuric acid solution and dissolving therein, and then separating a leachate from a residue.

(2) A rare earth crystallization step of adding an alkali metal sulfate to the leachate obtained in the leaching step to obtain a mixed precipitate of double sulfate of rare earth elements and a rare-earth-element-free solution (hereinafter, may be referred to as a RE-free solution).

(3) A sulfide raw material recovery step of adding a sulfurizing agent to the RE-free solution obtained in the rare earth crystallization step to separate a nickel-cobalt sulfide raw material and a residual solution.

A second aspect of the present invention has a dezincification step of adding a sulfurizing agent to the RE-free solution obtained in the rare earth crystallization step of the first aspect and separating contained zinc as a sulfide precipitate, then supplying a RE-free solution which is to be used in a sulfide raw material recovery step. Furthermore, a third aspect of the present invention is characterized in that, when a sulfurizing agent is added to the RE-free solution to separate zinc as a sulfide precipitate, a neutralizer is added to adjust a pH to a range of not less than 2.0 and not more than 2.5, and, with the pH range maintained, a sulfurizing agent is added to separate zinc.

A fourth aspect of the present invention is characterized in that, in the leaching step of the first aspect, the material containing positive and negative electrode active materials is added to a leachate to react with free sulfuric acid remaining in the leachate and thereby to obtain a post-neutralization leachate and a post-neutralization residue.

A fifth aspect of the present invention is characterized in that the post-neutralization residue obtained in the fourth aspect is used as the material containing positive and negative electrode active materials in the leaching step of the present invention, or as a part thereof.

A sixth aspect of the present invention is characterized in that the alkali metal sulfate to be added in the rare earth crystallization step of the first aspect is at least one kind of sodium sulfate and potassium sulfate.

A seventh aspect of the present invention is characterized in that the sulfurizing agent to be used in the first to the third aspects is at least one kind of hydrogen sulfide gas, sodium hydrogensulfide, and sodium sulfide.

A eighth aspect of the present invention is characterized in that, in the sulfide raw material recovery step of the first aspect, when nickel and cobalt in the rare-earth-element-free solution are recovered as sulfide, the pH of the rare-earth-element-free solution at the time of adding a sulfurizing agent is kept in a range of not less than 2.5 and not more than 4.5.

Advantageous Effects of Invention

According to the present invention, industrially remarkable effects shown below are achieved.

(1) Nickel and cobalt are separated from rare earth metals and recovered from a material containing positive and negative electrode active materials, the material being collected by disassembling and separating a spent nickel-metal hydride battery.

(2) The nickel-cobalt sulfide recovered according to the present invention is usable as they are, as a smelting raw material of nickel and cobalt.

(3) The nickel-cobalt sulfide obtained according to the present invention is usable as a raw material in the process of producing battery materials, such as nickel sulfate and cobalt metal.

(4) An existing nickel and cobalt smelting process or an existing battery material producing process is used as it is, whereby a cost for equipment can be controlled and the recovery can be realized at lower cost.

(5) The precipitate of double sulfate of the rare earth element and the alkali metal which are separated according to the present invention is usable as a raw material in the existing rare earth element purification process.

BRIEF DESCRIPTION OF DRAWINGS

FIG. 1 is a manufacturing process flow chart showing steps according to the present invention, wherein nickel and cobalt, and rare earth elements are separated and recovered from the material containing positive and negative electrode active materials in a nickel-metal hydride battery or the like.

DETAILED DESCRIPTION OF THE PREFERRED EMBODIMENTS

Hereinafter, with reference to the process flow chart shown in FIG. 1, there is explained in detail a method of the present invention for separating nickel and cobalt from a material containing positive and negative electrode active materials, the material being obtained by disassembling and separating a nickel-metal hydride battery.

First, a nickel-metal hydride battery is disassembled and separated to recover the material containing positive and negative electrode active materials. The recovered material containing positive and negative electrode active materials is treated through steps (1) to (3) shown below to recover nickel and cobalt as a precipitate which contains nickel-cobalt sulfide as main components.

(1) Leaching Step

The material containing positive and negative electrode active materials, which is obtained by disassembling and separating a nickel-metal hydride battery, is mixed with a sulfuric acid solution and heated to be dissolved. After dissolution, the material containing positive and negative electrode active materials may be further added to neutralize excess sulfuric acid and simultaneously to leach a part of a raw material. In the leaching step, a solution temperature is preferably maintained at 60 degrees C. or higher.

(2) Rare Earth Crystallization Step

Until reaching saturation, alkali metal sulfate is added to and dissolved in a leachate which has been obtained by allowing a neutralized supernatant solution produced in the leaching step to cool and performing solid-liquid separation, whereby a rare-earth-element-free solution (hereinafter, may be referred to as a RE-free solution) is separated from a mixed precipitate of double sulfate in which a rare earth element is bound to an alkali metal, and recovered.

(3) Sulfide Raw Material Recovery Step

With a pH maintained in a range of not less than 2.5 and not more than 4.5 by adding a neutralizer, a sulfurizing agent is added to the rare-earth-element-free solution (RE-free solution) which has been obtained by separating from the mixed precipitate of double sulfate in the rare earth crystallization step, whereby a precipitate which contains a nickel-cobalt sulfide as a main component is formed, and then the precipitate (Ni—Co sulfide raw material) is separated from a residual solution and recovered.

Note that the sulfide raw material recovery step may be performed by dividing into two stages of treatment steps shown in (3-1) and (3-2) below.

(3-1) Dezincification Step

A neutralizer is added to the RE-free solution, which has been obtained by separating from the mixed precipitate of double sulfate in the rare earth crystallization step, to adjust a pH to a range of not less than 2.0 and not more than 2.5, and then, with the pH range maintained, a sulfurizing agent is added to separate and remove zinc as a sulfide precipitate. At this time, a solution temperature is preferably maintained at 50 degrees C. or higher.

(3-2) Sulfide Raw Material Recovery Step A

With a pH maintained in a range of not less than 2.5 and not more than 4.5 by adding a neutralizer, a sulfurizing agent is further added to a zinc-free solution which remains after separating from zinc sulfate precipitate in the dezincification step, whereby a precipitate which contains a nickel-cobalt sulfide as a main component is formed, and then separated and recovered as a sulfide raw material. Although an aqueous solution of this zinc-free solution itself has slight buffer characteristics, a concentration of free acid formed by a sulfuration reaction is high, and therefore pH adjustment by a neutralizer is needed in order to prevent a reverse reaction.

Note that, regarding which is more desirable for performing the sulfide raw material recovery step, with or without dividing into two stages of the dezincification step and the sulfide raw material recovery step A, it depends on grade of zinc, a starter, which is contained in the material containing positive and negative electrode active materials, and also depends on dezincification capacity, required grade, etc. in the step of manufacturing nickel sulfate, cobalt sulfate, cobalt metal, etc., wherein the recovered sulfide raw material is introduced, and therefore it is desirable to make a trial calculation every case and choose the more desirable way.

A sulfurizing agent used for the sulfuration treatment includes hydrogen sulfide gas, sodium hydrogensulfide, sodium sulfide, etc., and any of these may be used. Note that, when sulfuration treatment is performed by dividing into two stages, it is desirable to use hydrogen sulfide gas, which enables a more highly selective sulfuration treatment, in the dezincification step.

Also in the sulfuration step of nickel sulfide and cobalt sulfide, if coprecipitation of impurities needs to be prevented, hydrogen sulfide is desirably used. Hydrogen sulfide is preferably used also in order to prevent the mixing of alkali metal ions into a solution.

A neutralizer used for the sulfuration treatment in the sulfide raw material recovery step includes, but is not limited to, sodium hydrogencarbonate, sodium carbonate, sodium hydroxide, etc. If the mixing of alkali metal ions into a solution needs to be prevented, it is desirable to use hydroxide or carbonate of nickel or cobalt.

An alkali metal sulfate used for the rare earth crystallization treatment includes, but is not limited to, sodium sulfate, potassium sulfate, etc.

The mixed sulfide of nickel and cobalt which is recovered according to the present invention can be introduced as it is, as a raw material, into the existing step of manufacturing nickel sulfate and cobalt sulfate, cobalt metal, etc. from a mixed sulfide raw material.

EXAMPLE

Hereinafter, the present invention is explained in detail by using Examples, but, the present invention is not limited to these Examples. Note that metal component was analyzed by ICP emission analysis.

A method for recovering a material containing positive and negative electrode active materials by using a spent nickel-metal hydride battery was performed in accordance with the following procedures.

A spent nickel-metal hydride battery was charged into a reduction firing furnace (electric furnace) in the state of a module, and while nitrogen gas was flown to create an inert atmosphere, a temperature of 550 degrees C. was maintained, and reduction roasting was performed for one hour to deactivate the battery. At this time, a synthetic resin which was a part of component materials of the battery was decomposed and carbonized. The reduction roasted battery was taken out; fractured and cut using a cutter; and crushed using a drum-type crusher. Then, wet classification was performed using a sieve with a sieve opening of 0.75 mm, whereby a material containing positive and negative electrode active materials was recovered in powder or aggregate form as a dehydrated minus-sieve product, thereby made into a material to be used for Examples.

Example 1

A 900 g aliquot of the material A containing positive and negative electrode active materials which had been recovered from a spent nickel-metal hydride battery A according to the above-mentioned procedure was taken, and put into a beaker which was to be used as a leaching and neutralizing chamber, followed by adding 4.7 liters of pure water thereto and gradually adding 1.0 liter of 64% sulfuric acid with stirring. A solution temperature was maintained at 80 degrees C. with continuous stirring, and the stirring was continued for 3 hours, whereby nickel and cobalt, each contained in the material containing positive and negative electrode active materials, were leached into a sulfuric acid solution to obtain a leached and neutralized solution.

Then, the material A containing positive and negative electrode active materials was further added to the leached and neutralized solution until the pH of the solution reached 2.0 to form a slurry. Note that a final amount of the further addition was 130 g.

Next, the slurry obtained in the above-mentioned leaching and neutralizing step was allowed to cool and left standing until the slurry reached room temperature, followed by filtering using a Buchner funnel, a filter bottle, and a 5C filter paper, whereby 4.3 liters of a leached and neutralized solution A was obtained.

The leached and neutralized solution A was poured into a beaker which was to be used as a rare earth crystallization chamber, and 330 g of sodium sulfate was added thereto with stirring. After the stirring for 60 minutes, solid-liquid separation was performed to separate a RE-free solution A from a mixed precipitate of double sulfate (a recovered material A by the rare earth crystallization step).

4.6 liters of the RE-free solution A was poured into a beaker which was to be used as a sulfide raw material recovery chamber, and, while maintained at a pH of 2.5 with stirring by using sodium hydrogencarbonate as a neutralizer, 650 g of sodium hydrogensulfide was added thereto, whereby Ni and Co contained in the solution were precipitated as sulfides. The precipitate was recovered by solid-liquid separation and repulp-washed with 3 liters of water, and then dehydrated to be recovered as a sulfide raw material A.

Table 1 shows grades and recovery amounts of the material containing positive and negative electrode active materials as a starter of the treatment, and solid materials recovered by the treatment.

followed by adding 4.7 liters of pure water thereto and gradually adding 1.0 liter of 64% sulfuric acid with stirring. A solution temperature was maintained at 80 degrees C. with continuous stirring, and the stirring was continued for 3 hours, whereby nickel and cobalt, each contained in the material containing positive and negative electrode active materials, were leached into a sulfuric acid solution to obtain a leached and neutralized solution. Then, the material B containing positive and negative electrode active materials was further added to the leached and neutralized solution until the pH of the solution reached 2.0 to form a slurry. Note that a final amount of the further addition was 110 g.

Next, the slurry obtained in the above-mentioned leaching and neutralizing step was allowed to cool and left standing until the slurry reached room temperature, followed by filtering using a Buchner funnel, a filter bottle, and a 5C filter paper, whereby 4.3 liters of a leached and neutralized solution B was obtained.

The leached and neutralized solution B was poured into a beaker which was to be used as a rare earth crystallization chamber, and 330 g of sodium sulfate was added thereto with stirring. After the stirring for 60 minutes, solid-liquid separation was performed to separate a RE-free solution B from a mixed precipitate of double sulfate (a recovered material B by the rare earth crystallization step).

TABLE 1

|  | Grade [wt %] | | | | | | | | | | Recovery amount |
| --- | --- | --- | --- | --- | --- | --- | --- | --- | --- | --- | --- |
|  | Ni | Co | Fe | Mn | Zn | K | Al | La | Y | Ce | [g] |
| Material A containing positive and negative electrode active materials | 47 | 4.4 | 0.6 | 3.6 | 0.16 | 3.0 | 1.2 | 11.5 | 0.78 | 5.8 | |
| Recovered material A by rare earth crystallization step | 0.29 | 0.05 | 0.01 | 0.05 | <0.01 | 2.1 | 0.03 | 21 | 0.45 | 9.3 | 220 |
| Sulfide raw material A | 51 | 5.9 | 0.3 | <0.01 | 0.15 | <0.01 | <0.01 | <0.01 | <0.01 | <0.01 | 650 |

Table 1 indicates that the sulfide raw material A was recovered, with Ni and Co being separated from Mn and rare earths. The sulfide raw material A recovered here has a grade enough to be used as a raw material to produce nickel sulfate and cobalt metal from a mixed sulfide raw material.

Also, it is indicated that Ni, Co, Fe, Mn, and Zn were considerably less mixed, with respect to rare earths, in the recovered material A by the rare earth crystallization step, compared with in the material containing positive and negative electrode active materials, and accordingly the recovered material has a grade enough to be introduced as it is, as a raw material, into a process of purifying a rare earth mixture in an existing factory.

Example 2

A 900 g aliquot of the material B containing positive and negative electrode active materials which had been recovered from a spent nickel-metal hydride battery B according to the above-mentioned procedure was taken, and put into a beaker which was to be used as a leaching and neutralizing chamber, 4.6 liters of the RE-free solution B was poured into a beaker which was to be used as a dezincification chamber, and maintained at a pH of 2.0 to 2.5 with stirring by using sodium hydrogencarbonate as a neutralizer while hydrogen sulfide was blown thereinto from a cylinder for 20 minutes at a flow rate equivalent to 1 g per minute, whereby a slurry after dezincification treatment was obtained.

Solid-liquid separation was performed for the slurry obtained after the dezincification treatment, to separate and remove a zinc sulfate precipitate (a recovered material B by a dezincification step), whereby a zinc-free solution B was obtained and poured into a beaker which was to be used as a sulfide raw material recovery chamber. While this zinc-free solution was maintained at a pH of 2.5 by using sodium hydrogencarbonate as a neutralizer with stirring, 550 g of sodium hydrogensulfide was added thereto to precipitate Ni and Co, each contained in the solution, as sulfides. The precipitate was recovered by solid-liquid separation and repulp-washed with 3 liters of water, and then dehydrated and recovered as a sulfide raw material B.

Table 2 shows grades and recovery amounts of the material containing positive and negative electrode active materials as a starter of the treatment, and solid materials recovered by the treatment.

TABLE 2

| | Grade [wt %] | | | | | | | | | | Recovery amount [g] |
|---|---|---|---|---|---|---|---|---|---|---|---|
| | Ni | Co | Fe | Mn | Zn | K | Al | La | Y | Ce | |
| Material B containing positive and negative electrode active materials | 42 | 3.5 | 1.7 | 3.4 | 0.88 | 3.8 | 1.0 | 11 | 0.56 | 5.2 | |
| Recovered material B by rare earth crystallization step | 0.25 | 0.03 | 0.02 | 0.04 | <0.01 | 2.1 | 0.02 | 19 | 0.30 | 8.3 | 220 |
| Recovered material B by dezincification step | 0.09 | 3.2 | 0.18 | <0.01 | 56 | <0.01 | <0.01 | <0.01 | <0.01 | <0.01 | 10 |
| Sulfide raw material B | 46 | 4.7 | 1.5 | <0.01 | 0.32 | <0.01 | <0.01 | <0.01 | <0.01 | <0.01 | 610 |

Table 2 indicates that the sulfide raw materials B was recovered with Ni and Co being separated from Mn and rare earths, and Zn was less mixed in the sulfide raw material B, compared with in the material containing positive and negative electrode active material. The sulfide raw material B recovered by Example 2 has a grade enough to be introduced as it is, as a raw material, into a process of producing nickel sulfate and cobalt metal from a mixed sulfide raw material.

Also, it is shown that Ni, Co, Fe, Mn, and Zn were considerably less mixed, with respect to rare earths, in the recovered material B by the rare earth crystallization step, compared with in the material containing positive and negative electrode active material, and accordingly the recovered material has a grade enough to be introduced as it is, as a raw material, into a process of purifying a rare earth mixture in an existing factory.

The invention claimed is:

1. A method for separating nickel, cobalt, and a rare earth element from a material containing positive and negative electrode active materials of a nickel-metal hydride battery, wherein a sulfide containing nickel and cobalt and a sulfate containing a rare earth element are obtained from the material containing positive and negative electrode active materials which constitutes the nickel-metal hydride battery, the method comprising:
   (1) a leaching step of mixing the material containing positive and negative electrode active materials with a sulfuric acid solution and dissolving therein, followed by separating a leachate from a residue,
   (2) a rare earth crystallization step of adding an alkali metal sulfate to the leachate obtained in the leaching step and thereby obtaining a mixed precipitate of double sulfate of a rare earth element and a rare-earth-element-free solution, and
   (3) a sulfide raw material recovery step of adding a sulfurizing agent to the rare-earth-element-free solution obtained in the rare earth crystallization step and thereby separating a nickel and cobalt sulfide raw material from a residual solution, and
   (4) a dezincification step of adding a sulfurizing agent to the rare-earth-element-free solution obtained in the rare earth crystallization step to separate zinc in the rare-earth-element-free solution as a sulfide precipitate, and supplying a residual solution after the separation as the rare-earth-element-free solution in the sulfide raw material recovery step.

2. The method for separating nickel, cobalt, and a rare earth element from a material containing positive and negative electrode active materials of a nickel-metal hydride battery according to claim 1,
   wherein the alkali metal sulfate to be added is at least one kind of sodium sulfate and potassium sulfate.

3. The method for separating nickel, cobalt, and a rare earth element from a material containing positive and negative electrode active materials of a nickel-metal hydride battery according to claim 1,
   wherein the sulfurizing agent is at least one kind of hydrogen sulfide gas, sodium hydrogensulfide, and sodium sulfide.

4. The method for separating nickel, cobalt, and a rare earth element from a material containing positive and negative electrode active materials of a nickel-metal hydride battery according to claim 1,
   wherein, when the sulfurizing agent is added in the sulfide raw material recovery step, a pH of the rare-earth-element-free solution is kept in a range of not less than 2.5 and not more than 4.5.

5. A method for separating nickel, cobalt, and a rare earth element from a material containing positive and negative electrode active materials of a nickel-metal hydride battery, wherein a sulfide containing nickel and cobalt and a sulfate containing a rare earth element are obtained from the material containing positive and negative electrode active materials which constitutes the nickel-metal hydride, the method comprising:
   (1) a leaching step of mixing the material containing positive and negative electrode active materials with a sulfuric acid solution and dissolving therein, followed by separating a leachate from a residue,
   (2) a rare earth crystallization step of adding an alkali metal sulfate to the leachate obtained in the leaching step and thereby obtaining a mixed precipitate of double sulfate of a rare earth element and a rare-earth-element-free solution, (3) a sulfide raw material recovery step of adding a sulfurizinq agent to the rare-earth-element-free solution obtained in the rare earth crystallization step and thereby separating a nickel and cobalt sulfide raw material from a residual solution, and (4) a dezincification step of adding a neutralizer to the rare-earth-element-free solution obtained in the rare earth crystallization step to adjust a pH to a range of not less than 2.0 and not more than 2.5, and, with the pH range maintained, further adding a sulfurizing agent to separate zinc in the rare-earth-element-free solution as a sulfide precipitate and supplying a residual solution after the separation as the rare-earth-element-free solution in the sulfide raw material recovery step.

6. The method for separating nickel, cobalt, and a rare earth element from a material containing positive and negative electrode active materials of a nickel-metal hydride battery according to claim 5,
wherein the alkali metal sulfate to be added is at least one kind of sodium sulfate and potassium sulfate.

7. The method for separating nickel, cobalt, and a rare earth element from a material containing positive and negative electrode active materials of a nickel-metal hydride battery according to claim 5,
wherein the sulfurizing agent is at least one kind of hydrogen sulfide gas, sodium hydrogensulfide, and sodium sulfide.

8. A method for separating nickel, cobalt, and a rare earth element from a material containing positive and negative electrode active materials of a nickel-metal hydride battery, wherein a sulfide containing nickel and cobalt and a sulfate containing a rare earth element are obtained from the material containing positive and negative electrode active materials which constitutes a nickel-metal hydride battery, the method comprising:

(1) a leaching step of mixing the material containing positive and negative electrode active materials with a sulfuric acid solution and dissolving therein, followed by separating a leachate from a residue, (2) a rare earth crystallization step of adding an alkali metal sulfate to the leachate obtained in the leaching step and thereby obtaining a mixed precipitate of double sulfate of a rare earth element and a rare-earth-element-free solution, and further adding the material containing positive and negative electrode active materials of a nickel-metal hydride battery to the rare-earth-element-free solution to react with free sulfuric acid remaining in the leachate, whereby obtaining a post-neutralization leachate and a post-neutralization residue to use the post-neutralization leachate as the leachate in the rare earth crystallization step, and (3) a sulfide raw material recovery step of adding a sulfurizing agent to the rare-earth-element-free solution obtained in the rare earth crystallization step and thereby separating a nickel and cobalt sulfide raw material from a residual solution.

9. The method for separating nickel, cobalt, and a rare earth element from a material containing positive and negative electrode active materials of a nickel-metal hydride battery according to claim 8,
wherein the post-neutralization residue is used as the material containing positive and negative electrode active materials in the leaching step, or as a part of the material containing positive and negative electrode active materials.

10. The method for separating nickel, cobalt, and a rare earth element from a material containing positive and negative electrode active materials of a nickel-metal hydride battery according to claim 8,
wherein the alkali metal sulfate to be added is at least one kind of sodium sulfate and potassium sulfate.

11. The method for separating nickel, cobalt, and a rare earth element from a material containing positive and negative electrode active materials of a nickel-metal hydride battery according to claim 8,
wherein the sulfurizing agent is at least one kind of hydrogen sulfide gas, sodium hydrogensulfide, and sodium sulfide.

* * * * *